(12) United States Patent
Maruyama (10) Patent No.: US 6,480,344 B1
(45) Date of Patent: Nov. 12, 2002

(54) OBJECTIVE LENS FOR OPTICAL PICK-UP (75) Inventor: Koichi Maruyama, Tokyo (JP)

(73) Assignee: Asahi Kogaku Kogyo Kabushiki Kaisha, Tokyo (JP)

(*) Notice: Subject to any disclaimer, the term of this patent is extended or adjusted under 35 U.S.C. 154(b) by 42 days.

(21) Appl. No.: 09/716,291

(22) Filed: Nov. 21, 2000

(30) Foreign Application Priority Data

Nov. 22, 1999 (JP) .............................. 11-331951

(51) Int. Cl.$^7$ ................................................ G02B 3/10
(52) U.S. Cl. ........................ 359/721; 359/719; 359/571
(58) Field of Search .................... 359/708–721, 359/558–576

(56) References Cited

U.S. PATENT DOCUMENTS

| | | | | |
|---|---|---|---|---|
| 5,408,281 A | * | 4/1995 | Zhang | 351/161 |
| 5,815,293 A | | 9/1998 | Komma et al. | 359/19 |
| 5,838,496 A | | 11/1998 | Maruyama et al. | 359/565 |
| 6,088,322 A | | 7/2000 | Broome et al. | 369/112 |
| 6,118,594 A | * | 9/2000 | Maruyama | 359/719 |
| 6,191,889 B1 | | 2/2001 | Maruyama | 359/566 |

FOREIGN PATENT DOCUMENTS

| | | |
|---|---|---|
| JP | 7-98431 | 4/1995 |
| JP | 11-287948 | 10/1999 |

* cited by examiner

*Primary Examiner*—Scott J. Sugarman
*Assistant Examiner*—M. Hasan
(74) *Attorney, Agent, or Firm*—Greenblum & Bernstein, P.L.C.

(57) ABSTRACT

An objective lens includes a refractive lens having a positive refractive power, and a diffractive lens structure having a plurality of concentric ring-shaped steps that are formed on a lens surface of the refractive lens. The objective lens is a biconvex plastic lens having first and second aspherical surfaces. The diffractive lens structure has such a wavelength dependence that at least two diffracted beams having different wavelengths with the same diffraction order form appropriate wavefronts for at least two kinds of optical discs having cover layers of different thickness, respectively. Further, the diffractive lens structure has a predetermined power at any points in a middle ring area that is concentrically arranged about the optical axis at a middle range of the radius of the refractive lens.

17 Claims, 5 Drawing Sheets

OBJECTIVE LENS FOR OPTICAL PICK-UP

BACKGROUND OF THE INVENTION

The present invention relates to a high NA (numerical aperture) objective lens installed in an optical pick-up of an optical disc apparatus that is capable of using a plurality of kinds of optical discs whose cover layers are different in thickness. Particularly, the present invention relates to the objective lens that has a diffractive lens structure formed on a surface of a refractive lens.

The optical disc includes an information layer on which digital information is recorded, and a transparent cover layer that covers the information layer.

There are several types of the optical discs. A CD (compact disc) or a CD-R (CD recordable) has the cover layer whose thickness is 1.2 mm, and the thickness of the cover layer of a DVD (digital versatile disc) is 0.6 mm.

Such a difference of thickness of the cover layer changes the relative position of the information layer with respect to a turntable, i.e., the distance between the optical pick-up and the information layer. Namely, the thicker the cover layer is, the greater the distance to the information layer from the optical pickup is. For example, the optical pick-up is required to move a beam spot away from the optical pick-up by 0.6 mm in the cover layer, which is equivalent to 0.4 mm in air, when the DVD is replaced with a CD or a CD-R.

Although a paraxial beam spot moves as the objective lens is moved, the change of the thickness of the cover layer changes spherical aberration. If the optical pick-up moves only the objective lens when the disc is replaced, wavefront of the laser beam is deteriorated. For instance, when the objective lens, which is designed to minimize the spherical aberration for the DVD, is used for reproducing the Information from the CD, the spherical aberration becomes too large to reproduce the information even if the objective lens moves to bring the beam spot to be coincident with the information layer.

Therefore, there has been known as prior art, an optical pick-up that adjusts the condition of the laser beam entering into the objective lens depending upon the thickness of the cover layer.

For example, Japanese Provisional Patent Publication No. Hei 7-98431 discloses such an optical pick-up. The optical system shown in this publication employs a holographic lens on the laser source side of the objective lens to divide the laser beam from the laser source into a zero-order parallel diffracted beam and a first-order divergent diffracted beam. The zero-order diffracted beam is used for the optical disc having a thinner cover layer (i.e., a DVD), the first-order diffracted beam is used for the optical disc having a thicker cover layer (i.e., a CD and a CD-R). The optical pick-up disclosed in the publication enables formation of diffraction-limited beam spots for the respective optical discs.

However, since the optical pick-up disclosed in the publication always divides the laser beam from the laser source into the zero- and first-order diffracted beams, and only one of these beams is used for recording/reproducing information at a time, the maximum efficiency in use of the light quantity is not more than 40%.

Further, since the diffracted beam of only one diffraction order is being used for recording/reproducing the information, the diffracted beam of the other diffraction order is an unnecessary beam. When the unnecessary order diffracted beam is not adequately diffused on the information layer of the optical disc, a light quantity of the unnecessary order diffracted beam reflected from the optical disc varies in response to the recorded information on the optical disc, which causes noise in the reproducing signal.

Still further, the recording density of a DVD is higher than that of a CD, which requires the optical pick-up for a DVD to form a smaller beam spot than the optical pick-up designed for the exclusive use for a CD (hereinafter referred to as an exclusive CD pick-up). Since the diameter of the beam spot has a positive correlation with the wavelength of the laser beam, the optical pick-up for a DVD requires the laser source whose oscillation wavelength is 635 through 660 nm that is shorter than the oscillation wavelength of an exclusive CD pick-up (i.e., 780 through 830 nm). On the other hand, the reflection characteristics of a CD-R require the laser source whose oscillation wavelength is about 780 nm.

Accordingly, when the optical pick-up having a single laser source as described in the publication employs a laser source that emits a laser beam having a shorter oscillation wavelength, it cannot reproduce the information from a CD-R.

SUMMARY OF THE INVENTION

It is therefore an object of the present invention to provide an objective lens for an optical pick-up, which is capable of recording/reproducing information on a plurality of kinds of the optical discs (e.g., CD, CD-R and DVD) whose cover layers are different in thickness. Further, the present invention is aimed to provide the objective lens that has higher efficiency in use of the light quantity than the conventional objective lens as disclosed in the above-identified publication.

For the above object, according to the present invention, there is provided an improved objective lens for an optical pick-up, which includes a refractive lens having a positive refractive power, and a diffractive lens structure having a plurality of concentric ring-shaped steps that are formed on at least one lens surface of the refractive lens. The diffractive lens structure has such a wavelength dependence that at least two diffracted beams having different wavelengths with the same diffraction order form appropriate wavefronts for at least two kinds of optical discs having cover layers of different thickness. Further, the diffractive lens structure has a predetermined power at any points in a middle ring area that is concentrically arranged about the optical axis at a middle range of the radius of the refractive lens. In the other words, the diffractive lens structure has no point where a power is zero. With respect to a lens, the power means the reciprocal of its focal length.

With this construction, the diffracted beam of the predetermined diffraction order at the first wavelength forms an appropriate beam spot on the recording layer of the first optical disc and the diffracted beam of the same diffraction order at the second wavelength forms an appropriate beam spot on the recording layer of the second optical disc.

When the diffractive lens structure has the power, the convergence of the diffracted beam varies with diffraction order, which diffuses the unnecessary order diffracted beam. Further, the light beam passing through the middle ring area has a great influence on forming a beam spot. Therefore, in the invention, since the diffractive lens structure has a predetermined power in the middle ring area, the unnecessary order diffracted beams are adequately diffused while the beam spot is clearly formed by the necessary order diffracted beam, which can reduce the noise in a reproduced signal.

An additional optical path length added by the ring-shaped steps of the diffractive lens structure is expressed by an optical path difference function $\Phi(h)$ as follows:

$$\Phi(h)=(P_2h^2+P_4h^4+P_6h^6+\ldots)\times m\times\lambda$$

where $P_2$, $P_4$ and $P_6$ are coefficients of second, forth and sixth orders, h is a height from the optical axis, m is diffraction order and $\lambda$ is wavelength.

According to the invention, the optical path difference function $\Phi(h)$ is defined such that the value thereof monotonously varies in the middle ring area without taking the extreme value. This means that the diffractive lens structure has a predetermined power at any points in the middle ring area.

The lens surface of the refractive lens is divided into a high NA exclusive area through which a light beam of a high NA, which is necessary only for an optical disc having a high recording density, passes, and a common area through which a light beam of a low NA, which is necessary and sufficient for an optical disc having a low recording density, passes.

The diffractive lens structure may be formed only within the common area, or over the entire area including the common area and the high NA exclusive area.

The middle ring area is preferably included in the common area. In this case, the diffractive lens structure may have the power at any points within the common area, i.e., the optical path difference function $\Phi(h)$ may be defined such that the value thereof monotonously varies in the common area. On the other hand, the diffractive lens structure may have point where a power is zero, i.e., the optical path difference function $\Phi(h)$ may take extreme value, in an area that surrounds the middle ring area.

It is preferable that the common area is inside of the circle where a light beam whose NA is 0.45 through 0.50 passes, and the middle ring area is defined as an area through which a light beam whose NA is 0.20 through 0.38 passes.

Further, the diffractive lens structure is preferable to have such a wavelength dependence that spherical aberration varies in the undercorrected direction as wavelength of incident light beam increases. As described above, the spherical aberration varies in the over corrected direction as the thickness of the cover layer increases. Therefore, when a longer wavelength laser source is used for an optical disc having a thicker cover layer, and a shorter wavelength laser source is used for an optical disc having a thinner cover layer, the change of the spherical aberration due to change of the cover layer's thickness is corrected by the above-mentioned wavelength dependence of the diffractive lens structure.

The diffractive lens structure is preferably satisfy the condition (1) or (2);

$$P_2\times(h_{45})^2\times m<3 \quad (1)$$

$$P_2\times(h_{45})^2\times m>8 \quad (2)$$

where $h_{45}$ is the height from the optical axis of a point where a light ray whose NA is 0.45 at the wavelength corresponding to the optical disc having thicker cover layer intersects the diffractive lens structure.

Further, when the condition (1) is satisfied, the following condition (3) is preferably satisfied, when the condition (2) is satisfied, the following condition (4) is preferably satisfied;

$$\Phi(h_{45})/\lambda<-7 \quad (3)$$

$$\Phi(h_{45})/\lambda>8. \quad (4)$$

Still further, when the condition (1) is satisfied, it is preferable that the diffractive lens structure satisfies the following condition (5) over the entire area on the lens surface;

$$\Phi(h)<0.5\lambda. \quad (5)$$

DESCRIPTION OF THE EMBODIMENTS

Figure 1A:
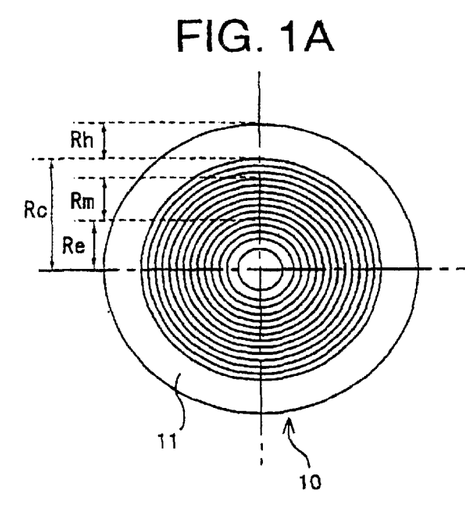
FIG. 1A is a front view of an objective lens embodying the invention.
Figures 1B, 1C:
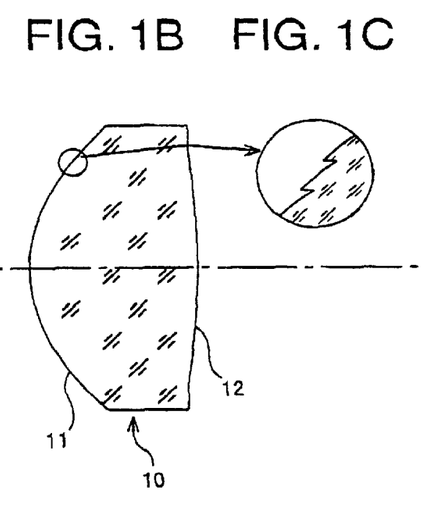
FIG. 1B is a vertical cross-sectional view of an objective lens of FIG. 1A.
FIG. 1C is an enlarged view of FIG. 1B.

FIGS. 1A, 1B and 1C show an objective lens 10 embodying the invention: FIG. 1A is a front view; FIG. 1B is a vertical cross-sectional view; and FIG. 1C is an enlarged side view of FIG. 1B. The objective lens 10 is applied to an optical pick-up of an optical disc apparatus that is capable of recording/reproducing a plurality of kinds of optical discs (e.g. CD, CD-R and DVD) provided with cover layers having different thicknesses.

The objective lens 10 is a biconvex plastic lens having first and second aspherical surfaces 11 and 12. A diffractive lens structure is formed on the first surface 11 of the objective lens 10 as shown in FIG. 1A. The diffractive lens structure is formed, similar to a Fresnel. lens, as a large number of concentric ring-shaped steps each of which has a wedge sectional shape. The diffractive lens structure gives a predetermined optical path difference at each of the boundaries between the adjacent ring-shaped steps.

The lens surface of the objective lens 10 is divided into a high NA exclusive area Rh through which a light beam of a high NA, which is necessary for an optical disc having a high recording density such as a DVD only, passes, and a common area Rc through which a light beam of a low NA, which is necessary and sufficient for an optical disc having a low recording density such as a CD or a CD-R, passes. The diffractive lens structure is formed only within the common area Rc, in this embodiment. However, it may be formed over the entire area including the common area Rc and the high NA exclusive area Rh.

The diffractive lens structure has a predetermined power at any points in a middle ring area Rm that is concentrically arranged about the optical axis at a middle range of the radius of the refractive lens. The common area Rc is inside of the circle where a light beam whose NA is 0.45 through 0.50 passes, and the middle ring area Rm is defined as an area through which a light beam whose NA is 0.20 through 0.38 passes. Namely the middle ring area Rm is included in the common area Rc. An area surrounded by the middle ring area Rm is defined as a central area Re.

Figure 2:
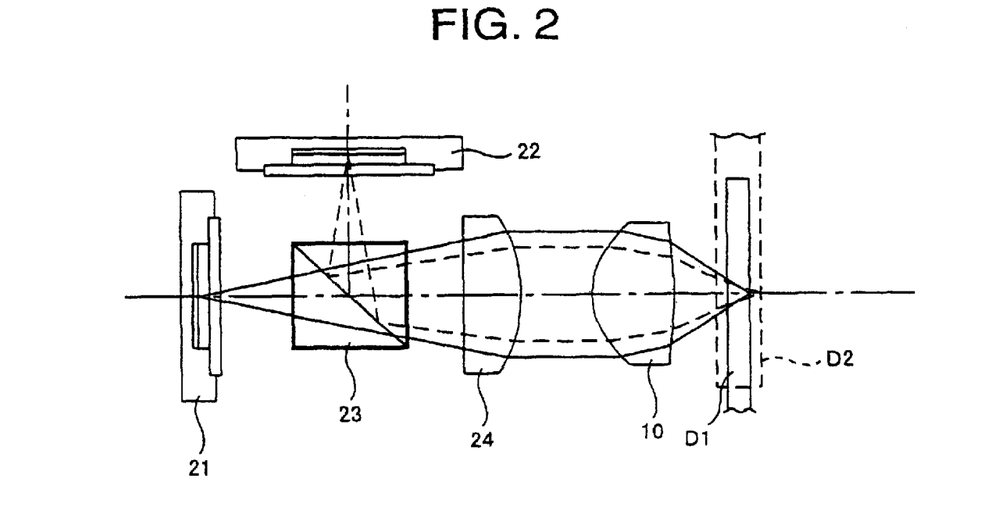
FIG. 2 shows an optical system of an optical pick-up on which the objective lens of FIG. 1A is mounted.

FIG. 2 shows an optical system of the optical pick-up in which the objective lens 10 is arranged. The optical system includes a first laser module 21, a second laser module 22, a beam combiner 23, a collimator lens 24 and the objective lens 10. Each of the modules 21 and 22 is provided with a semiconductor laser and a sensor that are mounted on a common substrate.

The DVD is a first optical disc having a first cover layer D1 (shown by a solid line) whose thickness is 0.6 mm. The CD and CD-R are second optical discs having a second cover layer D2 (shown by a dotted line) whose thickness is 1.2 mm. Further, the recording density of the first optical disc is higher than that of the second optical disc, a wavelength of the laser beam used for the first optical disc is required to be shorter than that for the second optical disc. On the other hand, the reflection characteristics of the CD-R require the laser source whose oscillation wavelength is about 780 nm.

Therefore, a semiconductor laser of the first module 21 used for the first optical disc emits the laser beam at wavelength of 655 nm or 657 nm, while a semiconductor laser of the second module 22 used for the second optical disc emits the laser beam at wavelength of 785 nm or 787 nm.

When the first optical disc is used, the first module 21 emits the laser beam L1 (shown by a solid line). The laser beam L1 passes through the beam combiner 23 and is collimated by the collimator lens 24. The collimated laser beam L1 is converged by the objective lens 10 to form a beam spot on the information layer of the first optical disc through the first cover layer D1.

When the second optical disc is used, the second module 22 emits the laser beam L2 (shown by a dotted line). The laser beam L2 is reflected by the beam combiner 23 and is collimated by the collimator lens 24. The collimated laser beam L2 is converged by the objective lens 10 to form a beam spot onto the information layer of the second optical disc through the second cover layer D2.

The diffractive lens structure formed on the objective lens 10 has such a wavelength dependence that a first-order diffracted beam forms an appropriate wavefront for the first optical disc at a wavelength of 655 nm or 657 nm, and forms an appropriate wavefront for the second optical disc at a wavelength of 785 nm or 787 nm. More specifically, the diffractive lens structure has such a wavelength dependence that spherical aberration varies in the undercorrected direction as wavelength of incident beam increases.

The spherical aberration changes in the overcorrected direction as the thickness of the cover layer increases. Further, the diffractive lens structure changes the spherical aberration in the undercorrected direction as the wavelength of the incident laser beam increases. And thus, since a longer wavelength laser beam is used for the second optical disc, and a shorter wavelength laser beam is used for the first optical disc, the change of the spherical aberration due to change of the cover layer's thickness is counterbalanced by the change of the spherical aberration due to the wavelength dependence of the diffractive lens structure.

Further, a focusing mechanism (not shown) adjusts the position of the objective lens 10 along the optical axis such that the beam spot is formed on the respective information layers.

An additional optical path length added by a diffractive lens structure is expressed by the following optical path difference function $\Phi(h)$:

$$\Phi(h) = (P_2 h^2 + P_4 h^4 + P_6 h^6 + \ldots) \times \lambda$$

where $P_2$, $P_4$ and $P_6$ are coefficients of second, fourth and sixth orders, h is the height from the optical axis and $\lambda$ is the wavelength of incident light beam. The function $\Phi(h)$ represents an optical path difference between an imaginary ray that is assumed not to be diffracted by the diffracting lens structure and a ray that is diffracted by the diffractive lens structure, at a point on the diffractive lens structure where the height from the optical axis is h. In such an expression, a negative value of the second order coefficient $P_2$ represents a positive paraxial power of the diffractive lens structure. Further, the negative power increases with the distance from the optical axis when the fourth order coefficient $P_4$ is larger than zero.

An actual microscopic shape of the diffractive lens structure is defined having a large number of concentric rings. The actual shape function $\Phi'(h)$ is defined by subtracting $\lambda \times m$ (m: integer) from $\Phi(h)$ as follows.

$$\Phi'(h) = (\text{MOD}(P_2 h^2 + P_4 h^4 + \ldots + C, 1) - C) \times \lambda_B$$

Symbol $\lambda_B$ is a blaze wavelength for which the steps of the grating give an optical path difference that is one wavelength long, and the diffractive efficiency becomes the maximum at the blaze wavelength $\lambda_B$. Symbol C is a constant defining a phase difference at a boundary between adjacent rings with respect to the point on the optical axis where $\Phi(h)$ equals 0 ($0 \leq C < 1$). The function MOD(x, y) represents the remainder when x is divided by y. MOD $(P_2 h^2 + P_4 h^4 + \ldots + C, 1)$ is equal to zero at the boundary. The diffractive lens structure is formed on the base curve that is the lens surface of the refractive lens. Inclinations and steps of the ring-shaped steps are designed such that the optical path differences are defined by $\Phi'(h)$.

As described above, the diffractive lens structure has a predetermined power within the middle ring area. In the other words, the optical path difference function $\Phi(h)$ is defined such that the value thereof monotonously varies in the middle ring area Rm without taking the extreme value.

With this construction, the unnecessary order diffracted beams are adequately diffused while the beam spot is clearly formed by the necessary order diffracted beam, which can reduce the noise in a reproduced signal.

Since the objective lens 10 of the embodiment is used at the two different working wavelengths, the blaze wavelength is different from at least one working wavelength. Therefore, the diffraction efficiency of at least one working wavelength that is different from the blaze wavelength cannot be 100%, It is inevitable that the unnecessary order diffracted beams are generated.

The following TABLE 1 and TABLE 2 show the diffraction efficiencies of the diffractive lens structure, which is blazed at the various blaze wavelengths, at various valuating wavelengths TABLE 1 shows the diffraction efficiencies of the first-order disffracted beam, i.e., the necessary order. TABLE 2 shows the diffraction efficiencies of the zero- and second-order diffracted beams, i.e., the unnecessary orders.

TABLE 1

| Valuating wavelength | Blaze wavelength [nm] Diffraction Order 1 | | | | | |
|---|---|---|---|---|---|---|
| [nm] | 640 | 655 | 710 | 720 | 730 | 785 |
| 630 | 0.9992 | 0.9948 | 0.9481 | 0.9346 | 0.9198 | 0.8161 |
| 633 | 0.9996 | 0.9960 | 0.9523 | 0.9394 | 0.9251 | 0.8241 |
| 640 | 1.0000 | 0.9982 | 0.9613 | 0.9496 | 0.9366 | 0.8421 |
| 645 | 0.9998 | 0.9992 | 0.9670 | 0.9563 | 0.9442 | 0.8543 |
| 650 | 0.9992 | 0.9998 | 0.9723 | 0.9624 | 0.9511 | 0.8659 |
| 655 | 0.9983 | 1.0000 | 0.9770 | 0.9680 | 0.9576 | 0.8769 |
| 660 | 0.9970 | 0.9998 | 0.9813 | 0.9731 | 0.9635 | 0.8874 |
| 700 | 0.9761 | 0.9865 | 0.9993 | 0.9973 | 0.9940 | 0.9524 |
| 710 | 0.9684 | 0.9804 | 1.0000 | 0.9993 | 0.9974 | 0.9638 |
| 720 | 0.9600 | 0.9735 | 0.9994 | 1.0000 | 0.9994 | 0.9735 |
| 730 | 0.9510 | 0.9658 | 0.9975 | 0.9994 | 1.0000 | 0.9815 |
| 740 | 0.9413 | 0.9573 | 0.9946 | 0.9976 | 0.9994 | 0.9879 |
| 770 | 0.9097 | 0.9287 | 0.9802 | 0.9862 | 0.9912 | 0.9988 |
| 775 | 0.9041 | 0.9236 | 0.9771 | 0.9835 | 0.9890 | 0.9995 |
| 780 | 0.8984 | 0.9183 | 0.9738 | 0.9807 | 0.9866 | 0.9999 |
| 785 | 0.8927 | 0.9130 | 0.9703 | 0.9776 | 0.9840 | 1.0000 |
| 790 | 0.8869 | 0.9075 | 0.9667 | 0.9744 | 0.9812 | 0.9999 |
| 795 | 0.8810 | 0.9021 | 0.9630 | 0.9711 | 0.9782 | 0.9995 |
| 800 | 0.8751 | 0.8965 | 0.9590 | 0.9675 | 0.9751 | 0.9988 |

TABLE 2

| Valuating wavelength | Blaze wavelength [nm] | | | | | |
|---|---|---|---|---|---|---|
| | Diffraction Order 0 | | | Diffraction Order 2 | | |
| [nm] | 655 | 720 | 785 | 655 | 720 | 785 |
| 630 | 0.0014 | 0.0146 | 0.0318 | 0.0017 | 0.0260 | 0.0869 |
| 633 | 0.0011 | 0.0137 | 0.0309 | 0.0013 | 0.0239 | 0.0823 |
| 640 | 0.0005 | 0.0117 | 0.0287 | 0.0006 | 0.0194 | 0.0723 |
| 645 | 0.0002 | 0.0104 | 0.0272 | 0.0002 | 0.0166 | 0.0657 |
| 650 | 0.0001 | 0.0091 | 0.0256 | 0.0001 | 0.0140 | 0.0595 |
| 655 | 0.0000 | 0.0079 | 0.0241 | 0.0000 | 0.0117 | 0.0538 |
| 660 | 0.0001 | 0.0068 | 0.0225 | 0.0001 | 0.0097 | 0.0484 |
| 700 | 0.0047 | 0.0008 | 0.0112 | 0.0036 | 0.0009 | 0.0182 |
| 710 | 0.0069 | 0.0002 | 0.0088 | 0.0051 | 0.0002 | 0.0134 |
| 720 | 0.0096 | 0.0000 | 0.0067 | 0.0067 | 0.0000 | 0.0096 |
| 730 | 0.0127 | 0.0002 | 0.0048 | 0.0084 | 0.0002 | 0.0065 |
| 740 | 0.0161 | 0.0008 | 0.0032 | 0.0102 | 0.0007 | 0.0041 |
| 770 | 0.0286 | 0.0048 | 0.0004 | 0.0157 | 0.0037 | 0.0004 |
| 775 | 0.0310 | 0.0057 | 0.0002 | 0.0166 | 0.0043 | 0.0002 |
| 780 | 0.0334 | 0.0068 | 0.0000 | 0.0175 | 0.0050 | 0.0000 |
| 785 | 0.0360 | 0.0080 | 0.0000 | 0.0184 | 0.0057 | 0.0000 |
| 790 | 0.0386 | 0.0092 | 0.0000 | 0.0193 | 0.0065 | 0.0000 |
| 795 | 0.0412 | 0.0105 | 0.0002 | 0.0202 | 0.0072 | 0.0002 |
| 800 | 0.0439 | 0.0119 | 0.0004 | 0.0211 | 0.0080 | 0.0003 |

As shown in TABLE 2, when the blaze wavelength is 720 nm, the diffraction efficiencies of the zero- and second-orders are about 0.8% and 1.2% at the short wavelength 655 nm, 0.8% and 0.6% at the long wavelength 785 nm, respectively. When the zero- and second-order diffracted beams are adequately diffused on the information layer of the optical disc, the zero- and second-order diffracted beams reflected from the optical disc are affected by the recorded information of the broad area. Therefore, the reflected light quantities of the zero- and second-order diffracted beams are averaged and remain invariant. In such a case, the unnecessary order diffracted beams do not affect the reproducing signal even if they are received by a photodetector.

On the other hand, when the zero- and second-order diffracted beams are not adequately diffused on the information layer of the optical disc, the zero- and second-order diffracted beams reflected from the optical disc include the recorded information of the narrow area. Therefore, the reflected light quantities of the zero- and second-order diffracted beams vary. In such a case, the unnecessary order diffracted beams cause noise in the reproducing signal when they are received by a photodetector. This noise, the so-called "jitter", cannot be separated from the reproducing signal. When the jitter exceeds acceptable limits, the optical pick-up cannot reproduce the recorded information on the optical disc. Therefore, it is necessary to adequately diffuse the unnecessary order diffracted beams.

In order to diffuse the unnecessary order diffracted beams, the diffractive lens structure should have a predetermined power at any points over the entire area of the lens surface or in the middle ring area Rm. When the diffractive lens structure has such power, the convergence of the diffracted beam varies with diffraction order, which diffuses the unnecessary order diffracted beam. if the diffractive lens structure has no power in the middle ring area Rm, the unnecessary order diffracted beam passing through the middle ring area Rm is not diffused enough, which causes the jitter.

Further, in the peripheral portion in the common area Rc, since the variation of the spherical aberration between different diffraction orders becomes larger, the unnecessary order diffracted beams are diffused by means of the spherical aberration even if the diffractive lens structure has no power in an area that surrounds the middle ring area Rm. Therefore, it is important that the diffractive lens structure has a predetermined power in the middle ring area Rm.

The diffractive lens structure is satisfy the condition (1) or (2);

$$P_2 \times (h_{45})^2 \times m < 3 \tag{1}$$

$$P_2 \times (h_{45})^2 \times m > 8 \tag{2}$$

where $h_{45}$ is the height from the optical axis of a point where a light ray whose NA is 0.45 at the wavelength corresponding to the optical disc having thicker cover layer intersects the diffractive lens structure.

Further, when the condition (1) is satisfied, the following condition (3) is satisfied, when the condition (2) is satisfied, the following condition (4) is satisfied;

$$\Phi(h_{45})/\lambda < -7 \tag{3}$$

$$\Phi(h_{45})/\lambda > 8. \tag{4}$$

When the diffractive lens structure has the above described wavelength dependence such that spherical aberration varies in the undercorrected direction as wavelength of incident light beam increases, the forth order coefficient $P_4$ of the optical path difference function $\Phi(h)$ has a negative value. The second order coefficient $P_2$ does not affect the optical performance regarding the spherical aberration.

Further, when the fourth order coefficient $P_4$ has a negative value, a positive value of the second order coefficient $P_2$ reduces the range of the variation of the optical path difference function $\Phi(h)$. The smaller the range of the variation of $\Phi(h)$ is, the smaller the number of the ring-shaped steps are needed.

The actual shape of the diffractive lens structure is provided with steps of one wavelength long in the optical axis direction at the position where the optical path difference function $\Phi(h)$ is equal to the integral multiple of the wavelength. That is, the diffractive lens structure is similar to a Fresnel lens having a plurality of concentric rings.

When the diffractive lens structure is formed on the aspherical lens surface of the refractive lens, the mechanical method with a precision lathe is suitable rather than the lithography method to form the structure. According to the mechanical method, the pattern of the diffractive lens structure is formed on a molding surface of a die by a cutting tool with the precision lathe, and then, the pattern is transferred to an injection molded replica. This replica becomes an objective lens.

However, the processing on the die by the cutting tool causes inevitable cutting errors of several micrometers at a corner of the boundary between the adjacent ring-shaped steps, which reduces the diffraction efficiency. That is, since the molding surface of the die has wedge shaped steps in section, boundaries of adjacent wedge shaped steps are formed as recesses. The corner of the boundary means the bottom corner of the recess that is difficult to cut with high accuracy. Thus, it is preferable that the number of the ring-shaped steps is as small as possible to ease the manufacturing. When the manufacturing becomes easy, the pattern of the diffractive lens structure can be formed with precision, which keeps the high diffraction efficiency.

If the second order coefficient $P_2$ has a positive value, the optical path difference function $\Phi(h)$ takes the positive local maximum. Further, if the local maximum of the function $\Phi(h)$ is within the middle ring area Rm, the unnecessary order diffracted beams are not diffused, which generates the jitter. Therefore, the height h where the function $\Phi(h)$ takes the local maximum should be out of the middle ring area Rm. This is defined by the conditions (1) and (2).

When the condition (1) and $P2 \leq 0$ are satisfied, the optical path difference function $\Phi(h)$ is defined such that the value thereof monotonously varies over the entire lens surface and does not have a local maximum. Further, when the condition (1) and $P2>0$ are satisfied, the function $\Phi(h)$ takes the local maximum in the central area Re that is surrounded by the middle ring area Rm. On the other hand, when the condition (2) is satisfied, the value of the function $\Phi(h)$ monotonously varies over the entire lens surface or takes the local maximum at the outer side of the middle ring area Rm.

The conditions (3) and (4) define ranges in which the optical path difference function $\Phi(h)$ should be in the peripheral portion of the common area Rc. When the condition (1) is satisfied, the function $\Phi(h)$ gradually decreases as the height h increases in the common area Rc. In this case, when the condition (3) is further satisfied, the gradient of the function $\Phi(h)$ increases in the negative direction, which keeps the local maximum point out of the middle ring area Rm.

On the other hand, when the condition (2) is satisfied, the optical path difference function $\Phi(h)$ gradually increases as the height h increases in the common area Rc. In this case, when the condition (4) is further satisfied, the gradient of the function $\Phi(h)$ increases in the positive direction, which keeps the local maximum point out of the common area Rc.

Still more, when the local maximum exceeds one wavelength long, the ring-shaped step including the local maximum becomes depressed from the adjacent ring-shaped steps. That is, the outer boundary surface of the depressed ring-shaped step faces the optical axis, and the inner boundary surface of the depressed ring-shaped step faces the periphery of the objective lens 10. Such a diffractive lens structure requires a hard-to-machine mold that has a ring-shaped pattern jutted from adjacent ring-shaped patterns on the molding surface. Therefore, the diffractive lens structure preferably satisfies the following condition (5) in order not to form the depressed ring-shaped step;

$$\Phi(h)<0.5\lambda. \quad (5)$$

The diffractive lens structure is formed by assigning recesses and projections to the lens surface of the refractive lens. Each of the boundaries between the adjacent ring-shaped steps of the diffractive lens structure is in the position where the actual shape function $\Phi'(h)$ equals $0.5\lambda$, and the step of one wavelength long appears at every boundary. That is, the one side along the radius of the wedge sectional shape of the ring-shaped step is jutted from the lens surface by $0.5\lambda$, and the other side thereof is recessed from the lens surface by $-0.5\lambda$. Therefore, when the local maximum value is smaller than $0.5\lambda$, all of the boundary surfaces, which are substantially parallel to the optical axis, are faced to the optical axis or all of the boundary surfaces are faced to the periphery of the objective lens 10. As a result, the diffractive lens structure is formed without causing the depressed ring-shaped step.

Three embodiments according to the above mentioned construction will be described hereinafter. The objective lens 10 of the embodiments are designed as a compatible optical pick-up for both of the first optical disc such as a DVD and the second optical disc such as a CD or a CD-R. The diffractive lens structure is formed on the first surface 11 of the objective lens 10. The first-order diffracted beam is used as a necessary order diffracted beam.

First Embodiment

Figure 3A:
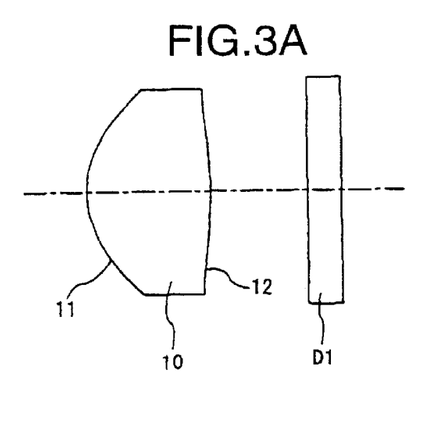
FIG. 3A is a lens diagram showing an objective lens of a first embodiment with a cover layer of an optical disc having a thinner cover layer.
Figure 3B:
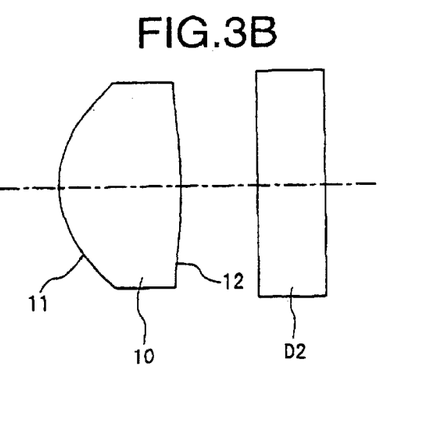
FIG. 3B is a lens diagram showing the objective lens of the first embodiment with a cover layer of an optical disc having a thicker cover layer.

FIG. 3A shows the objective lens 10 of the first embodiment and the cover layer $D_1$ of the first optical disc and FIG. 3B shows the objective lens 10 of the first embodiment and the cover layer $D_2$ of the second optical disc. In the first embodiment, the diffractive lens structure is formed within the common area ($0 \leq h < 1.66$) and the high NA exclusive area ($1.66 \leq h$) is formed as a continuous aspherical surface without steps. A base curve, which is the shape of the surface of the refractive lens when the diffractive lens structure is not formed, of the common area is an aspherical surface different from the high NA exclusive area.

The numerical constructions of the first embodiment are described in TABLE 3. The surface numbers 1 and 2 represent the objective lens 10 and the surface numbers 3 and 4 represent the cover layer of the optical disc. In TABLE 3, NA denotes numerical aperture, f(unit: mm) denotes the total focal length, $\lambda_1$ (unit: nm) denotes the wavelength for the first optical disc, $\lambda_2$ (unit nm) denotes the wavelength for the second optical disc, $\lambda_B$ (unit: nm) denotes a blaze wavelength, r (unit: mm) denotes a radius of curvature of a surface (the values at the vertex for aspherical surface), $d_1$ (unit: mm) denotes a distance between the surfaces along the optical axis for the first optical disc, $d_2$ (unit: mm) denotes the distance for the second optical disc and $n\lambda$ denotes a refractive index at a wavelength $\lambda$ nm.

The base curve of the common area and the high NA exclusive area of the first surface 11, and the second surface 12 are rotationally-symmetrical aspherical surfaces. The rotationally- symmetrical aspherical surface is expressed by the following equation:

$$X(h) = \frac{h^2 c}{1+\sqrt{1-(1+K)h^2c^2}} + A_4h^4 + A_6h^6 + A_8h^8 + A_{10}h^{10} + A_{12}h^{12}$$

X(h) is a sag, that is, a distance of a curve from a tangential plane at a point on the surface where the height from the optical axis is h. Symbol c is a curvature (1/r) of the vertex of the surface, K is a conic constant, $A_4$, $A_6$, $A_8$, $A_{10}$ and $A_{12}$ are aspherical surface coefficients of fourth, sixth, eighth, tenth and twelfth orders, respectively.

The radius of curvatures of the aspherical surfaces in TABLE 3 are values on the optical axis. The constant K and coefficients $A_4$ through $A_{12}$ are shown in TABLE 4, and the coefficients of the optical path difference function that define the diffractive lens structure are shown in TABLE 5. The symbol Δ represents a distance (unit: mm) between two aspherical surfaces along the optical axis. One aspherical surface is the base curve of the common area and the other aspherical surface is an imaginary surface that is extended from the high NA exclusive area. The minus sign of the distance D means that the imaginary aspherical surface is located at the beam incident side with respect to the base curve of the common area.

TABLE 3

$\lambda_1$ = 655 nm NA 0.60 f = 3.330 mm $h_{45}$ = 1.507 mm
$\lambda_2$ = 785 nm NA 0.50 f = 3.349 mm
$\lambda_B$ = 720 nm

| Surface number | r | d1 | d2 | n655 | n785 |
|---|---|---|---|---|---|
| 1 | 2.122 | 2.190 | 2.190 | 1.54063 | 1.53665 |
| 2 | −7.872 | 1.735 | 1.368 | | |
| 3 | ∞ | 0.600 | 1.200 | | |
| 4 | ∞ | | | | |

TABLE 4

First surface

| | Common area ($0 \leq h < 1.66$) | High-NA exclusive area ($1.66 \leq h$) | Second surface |
|---|---|---|---|
| r | 2.122 | 2.115 | — |
| K | −0.440 | −0.441 | 0.000 |
| A4 | $-2.539 \times 10^{-3}$ | $-4.380 \times 10^{-4}$ | $1.822 \times 10^{-2}$ |
| A6 | $-4.110 \times 10^{-4}$ | $-1.840 \times 10^{-4}$ | $-6.770 \times 10^{-3}$ |
| A8 | $-1.293 \times 10^{-4}$ | $-9.530 \times 10^{-5}$ | $1.628 \times 10^{-3}$ |
| A10 | $1.407 \times 10^{-5}$ | $1.550 \times 10^{-5}$ | $-2.610 \times 10^{-4}$ |
| A12 | $-4.540 \times 10^{-6}$ | $-5.290 \times 10^{-6}$ | $1.860 \times 10^{-5}$ |
| Δ | −0.0254 | — | — |

TABLE 5

Common area ($0 \leq h < 1.66$)

| P2 | −1.4800 |
| P4 | −1.7710 |
| P6 | $-1.6420 \times 10^{-1}$ |
| P8 | 0.0000 |

Second Embodiment

The objective lens 10 of the second embodiment will be described. In the second embodiment, the diffractive lens structure is formed within the common area (0≦h<1.69) and the high NA exclusive area (1.66≦h) is formed as a continuous aspherical surface without steps. The base curve of the common areas is different aspherical surface from the high NA exclusive area. Since the shape of the objective lens of the second embodiment is similar to that of the first embodiment, the lens diagram is omitted. The basic construction of the objective lens of the second embodiment is shown in TABLE 6, the aspherical coefficients are shown in TABLE 7, and the coefficient of the optical path difference function are shown in TABLE 8.

TABLE 6

$\lambda_1$ = 655 nm NA 0.60 f = 3.330 nm $h_{45}$ = 1.521 mm
$\lambda_2$ = 785 nm NA 0.50 f = 3.380 mm
$\lambda_B$ = 720 nm

| Surface number | r | d1 | d2 | n655 | n785 |
|---|---|---|---|---|---|
| 1 | 2.034 | 2.190 | 2.190 | 1.54063 | 1.53665 |
| 2 | −7.273 | 1.754 | 1.422 | | |
| 3 | ∞ | 0.600 | 1.200 | | |
| 4 | ∞ | | | | |

TABLE 7

First surface

| | Common area ($0 \leq h < 1.69$) | High-NA exclusive area ($1.69 \leq h$) | Second surface |
|---|---|---|---|
| r | 2.034 | 2.134 | — |
| K | −0.440 | −0.441 | 0.000 |
| A4 | $-3.351 \times 10^{-3}$ | $-8.200 \times 10^{-4}$ | $1.696 \times 10^{-2}$ |
| A6 | $-4.403 \times 10^{-4}$ | $-1.350 \times 10^{-4}$ | $-5.294 \times 10^{-3}$ |
| A8 | $-1.557 \times 10^{-4}$ | $-1.340 \times 10^{-4}$ | $1.529 \times 10^{-3}$ |
| A10 | $3.942 \times 10^{-5}$ | $4.910 \times 10^{-5}$ | $-3.852 \times 10^{-4}$ |
| A12 | $-9.537 \times 10^{-6}$ | $-1.060 \times 10^{-5}$ | $4.009 \times 10^{-5}$ |
| Δ | −0.0158 | — | — |

TABLE 8

Common area ($0 \leq h < 1.69$)

| P2 | $1.0000 \times 10$ |
| P4 | −1.4890 |
| P6 | $-1.4380 \times 10^{-1}$ |
| P8 | 0.0000 |

Third Embodiment

The objective lens 10 of the third embodiment will be described. In the third embodiment, a common base curve is applied to both of the common area and the high NA exclusive area. The diffractive lens structure is formed over the entire area of the first surface 11. Since the shape of the objective lens of the third embodiment is similar to that of the first embodiment, the lens diagram is omitted. The basic construction of the objective lens of the third embodiment is shown in TABLE 9, the aspherical coefficients are shown in TABLE 10, and the coefficient of the optical path difference function are shown in TABLE 11.

TABLE 9

$\lambda_1$ '2 657 nm NA 0.60 f = 3.447 mm $h_{45}$ = 1.563 mm
$\lambda_2$ = 787 nm NA 0.46 f = 3.47 mm
$\lambda_B$ = 720 nm

| Surface number | r | d1 | d2 | n655 | n785 |
|---|---|---|---|---|---|
| 1 | 2.162 | 2.400 | 2.400 | 1.54063 | 1.53665 |
| 2 | −7.999 | 1.732 | 1.373 | | |
| 3 | ∞ | 0.600 | 1.200 | | |
| 4 | ∞ | | | | |

TABLE 10

|  | First surface | Second surface |
|---|---|---|
| K | −0.440 | 0.000 |
| A4 | −2.655 × 10$^{-3}$ | 1.527 × 10$^{-2}$ |
| A6 | −2.351 × 10$^{-4}$ | −2.743 × 10$^{-3}$ |
| A8 | −8.099 × 10$^{-5}$ | 7.932 × 10$^{-6}$ |
| A10 | 1.595 × 10$^{-5}$ | 2.556 × 10$^{-5}$ |
| A12 | −4.538 × 10$^{-6}$ | 0.000 |

TABLE 11

| P2 | 1.000 |
|---|---|
| P4 | −1.4732 |
| P6 | −1.3082 × 10$^{-1}$ |
| P8 | 0.0000 |

Figure 4:
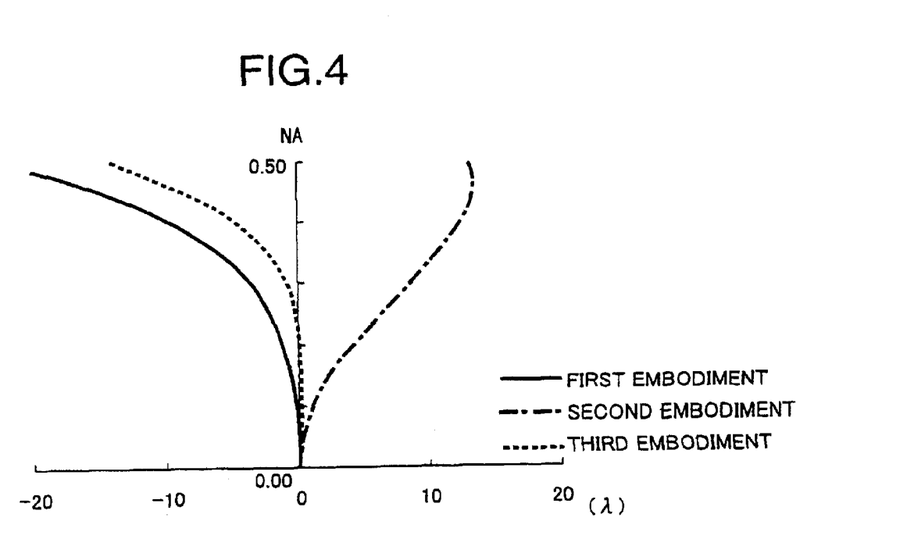
FIG. 4 is a graph showing relationships between NA and an optical path difference function for the first, second and third embodiments.

The following TABLE 12 shows the values of the optical path difference function Φ(h) in the first, second and third embodiments. Further, FIG. 4 is a graph showing the function Φ(h).

TABLE 12

|  | 1st Embodiment | | 2nd Embodiment | | 3rd Embodiment | |
|---|---|---|---|---|---|---|
| NA | h | p (h) | h | p (h) | h | p (h) |
| 0.50 | 1.675 | −21.70 | 1.690 | 13.07 | 1.737 | −13.99 |
| 0.45 | 1.507 | −14.42 | 1.521 | 13.39 | 1.563 | −8.26 |
| 0.40 | 1.340 | −9.31 | 1.352 | 12.43 | 1.390 | −4.50 |
| 0.35 | 1.172 | −5.80 | 1.183 | 10.68 | 1.216 | −2.16 |
| 0.30 | 1.005 | −3.47 | 1.014 | 8.55 | 1.042 | −0.82 |
| 0.25 | 0.837 | −1.96 | 0.845 | 6.33 | 0.869 | −0.14 |
| 0.20 | 0.670 | −1.04 | 0.676 | 4.25 | 0.695 | 0.12 |
| 0.15 | 0.502 | −0.49 | 0.507 | 2.47 | 0.521 | 0.16 |
| 0.10 | 0.335 | −0.19 | 0.338 | 1.12 | 0.347 | 0.10 |
| 0.05 | 0.167 | −0.04 | 0.169 | 0.28 | 0.174 | 0.03 |
| 0.00 | 0.000 | 0.00 | 0.000 | 0.00 | 0.000 | 0.00 |

In the first embodiment, $P_2 \times (h_{45})^2 \times m = -3.36$, $\Phi(h_{45})/\lambda = -14.32$, the conditions (1) and (2) are satisfied. Since the coefficients $P_2$ and $P_4$ are negative numbers, the optical path difference function has no local maximum as shown in FIG. 4, the function monotonously decreases as the height h increases in the common area. In this case, since the variation range of the optical path length difference function becomes wider, the number of steps of the diffractive lens structure becomes relatively larger. However, since the function has no local maximum, the diffraction powers of the respective diffraction orders are different one another in any point on the diffractive lens structure, which adequately diffuses the unnecessary order diffracted beams of the zero- and second-orders while the beam spot is clearly formed by the first-order diffracted beam. This can extremely reduce the jitter.

Figure 5A:
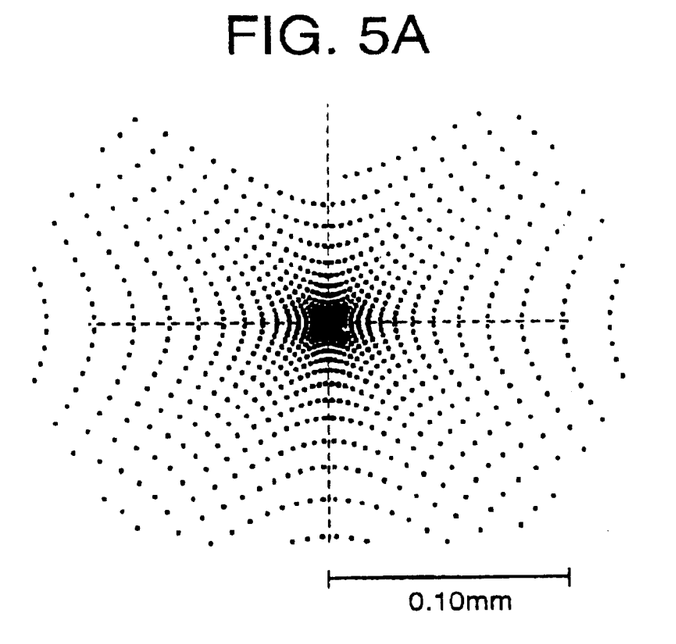
FIGS. 5A and 5B are spot diagrams each of which shows diffusion of a zero-order diffracted beam when the objective lens of the first embodiment is used with the optical disc having a thicker cover layer.
Figure 5B:
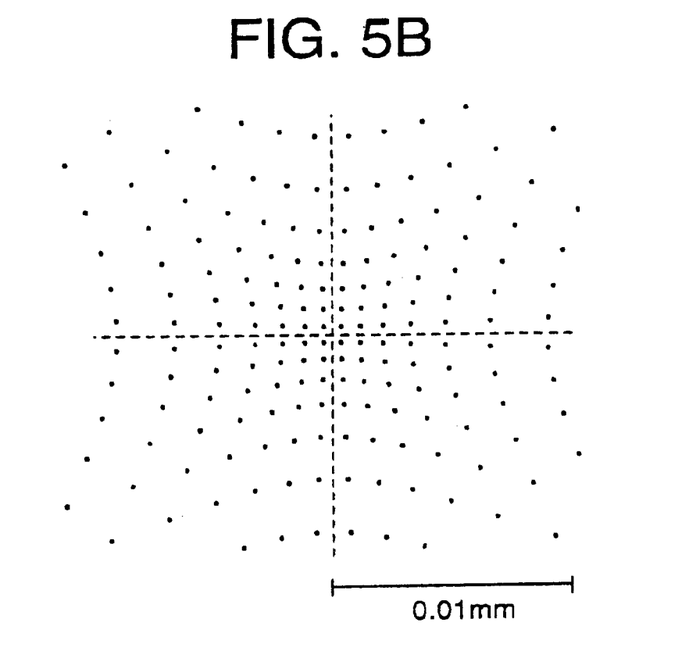

When the first optical disc is used, the light amount of the unnecessary second-order diffracted beam becomes larger and should be diffused. When the second optical disc is used, the light amount of the unnecessary zero-order diffracted beam becomes larger and should be diffused. Here, an effect to diffuse the zero-order diffracted beam when the second optical disc is used is described with spot diagrams. FIGS. 5A and 5B show the spot diagrams each of which shows the diffusion of the zero-order diffracted beam when the objective lens of the first embodiment is used with the second optical disc. Scales are illustrated in the drawings.

These spot diagrams show that the objective lens of the first embodiment can adequately diffuse the unnecessary order diffracted beam while the beam spot is clearly formed by the necessary order diffracted beam.

In the first embodiment, the back focus of the objective lens when the first optical disc is used is shorter than that when the second optical disc is used due to the power of the diffractive lens structure of the objective lens. Further, the high NA exclusive area, on which the diffractive lens structure is not formed, is optimized for use of the first optical disc. Therefore, although the laser beam passing through the high NA exclusive area Rh is converged to form the beam spot when the first optical disc is used, it is defocused when the second optical disc is used. As a result, the beam spot does not become too small for the second optical disc having a lower recording density, and thus, it is not necessary to arrange an aperture stop to cut off the laser beam incident on the high NA exclusive area.

In the second embodiment, as $P_2 \times (h_{45})^2 \times mm = 23.12$, and $\Phi(h_{45})/\lambda = 13.39$, the conditions (3) and (4) are satisfied. Since the coefficients P2 and P4 have opposite signs, the optical path difference function Φ(h) takes the local maximum within the common area Rc. However, since the coefficient P2 is relatively large, the function Φ(h) takes the local maximum at NA=0.45 that is outside of the middle ring area Rm as shown in FIG. 4. Since the variation of the spherical aberration between the diffraction orders becomes large in the area outside the middle ring area Rm, the unnecessary order diffracted beams are diffused even if the function Φ(h) takes a local maximum therein. Further, the laser beam passing through the middle ring area Rm, which has a great influence on the occurrence of the jitter, converges at different points on the optical axis according to the diffraction orders, because the function Φ(h) does not take a local maximum in the middle area Rm. Therefore, the unnecessary order diffracted beams are defocused and diffused with respect to the information layer of the optical disc. On the whole, the zero- and second-order diffracted beams are adequately diffuses while the beam spot is clearly formed by the first-order diffracted beam. This can extremely reduce the jitter.

Figure 6A:
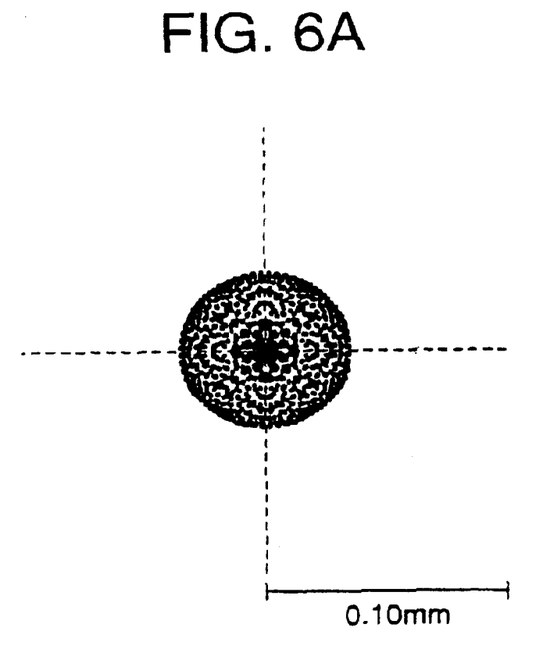
FIGS. 6A and 6B are spot diagrams each of which shows diffusion of a zero-order diffracted beam when the objective lens of the second embodiment is used with the optical disc having a thicker cover layer.
Figure 6B:
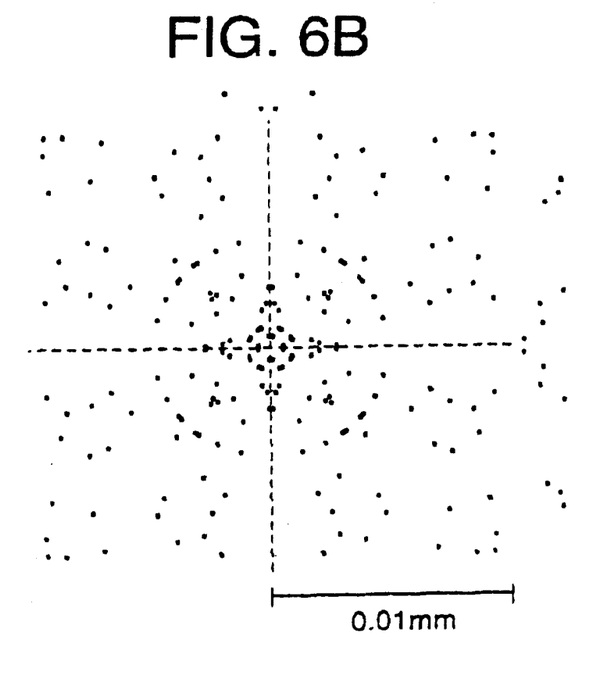

FIGS. 6A and 6B show the spot diagrams each of which shows the diffusion of the zero-order diffracted beam when the objective lens of the second embodiment is used with the second optical disc. The scales of FIGS. 6A and 6B are the same as the FIGS. 5A and 5B, respectively. These spot diagram shows that the objective lens of the second embodiment also diffuse the unnecessary order diffracted beam. Although the objective lens of the first embodiment has greater effect to diffuse the unnecessary order diffracted beam than the objective lens of the second embodiment, the effect of the second embodiment is enough to reduce the jitter.

In the third embodiment, as $P_2 \times (h_{45})^2 \times mm = 2.44$, and $\Phi(h_{45})/\lambda = 8.26$, the conditions (1) and (2) are satisfied. Since the coefficients P2 and P4 have opposite signs, the optical path difference function Φ(h) takes the local maximum within the common area eRc. However, since the coefficient P2 is relatively small, the function Φ(h) takes the local maximum at NA=0.15 in the central area Re as shown in FIG. 4. Since the central area Re is smaller than the middle ring area Rm in size, an influence of the unnecessary order diffracted beams passing through the central area Re upon the beam spot is smaller than that of the unnecessary order diffracted beams passing through the middle ring area Rm. Therefore, the beam spot is resistant to be affected by the unnecessary order diffracted beams even if the function Φ(h) takes a local maximum in the central area Re. Further, the laser beam passing through the middle ring area Rm converges at different points on the optical axis according to the diffraction orders, because the function Φ(h) does not take a local maximum in the middle area Rm. Therefore, the unnecessary order diffracted beams are defocused and diffused with respect to the information layer of the optical disc. On the whole, the zero- and second-order diffracted beams are adequately diffused while the beam spot is clearly formed by the first-order diffracted beam. This can reduce the jitter.

Still further, since the objective lens of the third embodiment satisfies the condition (5) over the entire area on the lens surface, the diffractive lens structure does not have the depressed ring-shaped step, which eases the processing of the molding surface of the die.

Figure 7A:
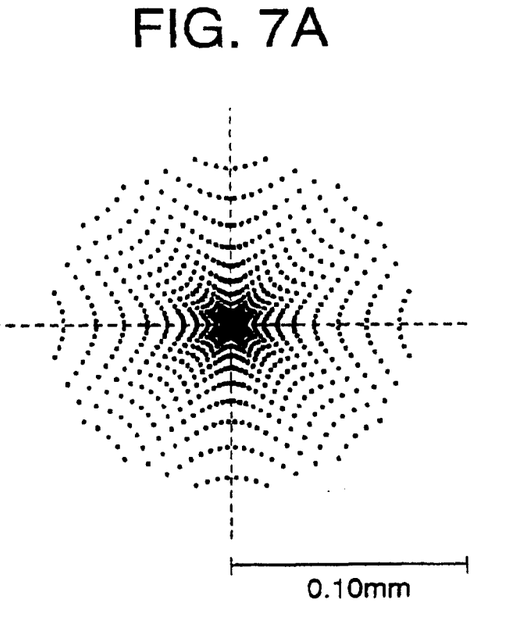
FIGS. 7A and 7B are spot diagrams each of which shows diffusion of a zero-order diffracted beam when the objective lens of the third embodiment is used with the optical disc having thicker cover layer.
Figure 7B:
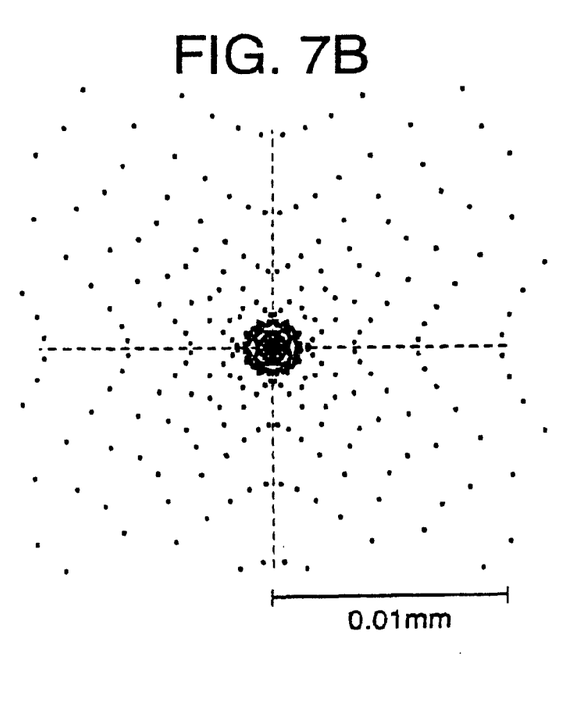

FIGS. 7A and 7B show the spot diagrams each of which shows the diffusion of the zero-order diffracted beam when the objective lens of the third embodiment is used with the second optical disc. The scales of FIGS. 7A and 7B are the same as the FIGS. 5A and 5B, respectively. These spot diagram shows that the objective lens of the third embodiment also diffuse the unnecessary order diffracted beam. Although the objective lens of the first embodiment has greater effect to diffuse the unnecessary order diffracted beam than the objective lens of the third embodiment, the effect of the third embodiment is enough to reduce the jitter.

It should be noted that the backfocus of the objective lens when the first optical disc is used is substantially coincident with the backfocus when the second optical disc is used, in the second and third embodiments. Therefore, the optical pick-up that employs the objective lens of the second or third embodiment requires a shield to cut off the laser beam incident on the high NA exclusive area when the second optical disc is used. For instance, a short-wavelength pass filter that transmits the laser beam at wavelength shorter than 700 nm can be used as the shield.

As described above, according to the invention, since the variation of the aberration due to the change of the thickness of the cover layer can be corrected by the diffractive lens structure formed on the lens surface of the objective lens, the objective lens of the invention can be used in a compatible optical pick-up between CD, CD-R and DVD with high efficiency. Further, the unnecessary order diffracted beams are adequately diffused while the beam spot is clearly formed by the necessary order diffracted beam, which can reduce the noise in a reproduced signal.

The present disclosure relates to the subject matter contained in Japanese Patent Application No. HEI 11-331951, filed on Nov. 22, 1999, which is expressly incorporated herein by reference in its entirety.

What is claimed is:

1. An objective lens for an optical pick-up, comprising:
a refractive lens having a positive refractive power; and
a diffractive lens structure having a plurality of concentric ring-shaped steps that are formed on at least one lens surface of said refractive lens,
wherein said diffractive lens structure has such a wavelength dependence that at least two diffracted beams having different wavelengths with the same diffraction order form appropriate wavefronts for at least two kinds of optical discs having cover layers of different thickness, respectively,
wherein said diffractive lens structure has a predetermined power at any points in a middle ring area that is concentrically arranged about the optical axis at a middle range of the radius of said refractive lens, and
wherein said middle ring area is defined as an area through which a light beam whose NA is 0.20 through 0.38 passes.

2. An objective lens for an optical pick-up, comprising:
a refractive lens having a positive refractive power; and
a diffractive lens structure having a plurality of concentric ring-shaped steps that are formed on at least one lens surface of said refractive lens,
wherein said diffractive lens structure has such a wavelength dependence that at least two diffracted beams having different wavelengths with the same diffraction order form appropriate wavefronts for at least two kinds of optical discs having cover layers of different thickness, respectively,
wherein said diffractive lens structure has a predetermined power at any points in a middle ring area that is concentrically arranged about the optical axis at a middle range of the radius of said refractive lens, and
wherein said refractive lens has a high NA exclusive area through which a light beam of a first NA, which is necessary only for an optical disc having a first recording density, passes, and a common area through which a light beam of a second NA, which is lower than said first NA and is necessary and sufficient for an optical disc having a second recording density that is lower than said first recording density, passes, wherein said common area is located at the center of the lens surface and is surrounded by said high NA exclusive area, and wherein said middle ring area is included in said common area.

3. The objective lens according to claim 2, wherein said diffractive lens structure has said predetermined power at any points within said common area.

4. An objective lens for an optical pick-up, comprising:
a refractive lens having a positive refractive power; and
a diffractive lens structure having a plurality of concentric ring-shaped steps that are formed on at least one lens surface of said refractive lens,
wherein said diffractive lens structure has such a wavelength dependence that at least two diffracted beams having different wavelengths with the same diffraction order form appropriate wavefronts for at least two kinds of optical discs having cover layers of different thickness, respectively,
wherein said diffractive lens structure has a predetermined power at any points in a middle ring area that is concentrically arranged about the optical axis at a middle range of the radius of said refractive lens, and
wherein said diffractive lens structure has no power in an area that surrounds said middle ring area.

5. The objective lens according to claim 4, wherein every boundary surface between adjacent concentric ring-shaped steps faces the optical axis.

6. The objective lens according to claim 4, wherein every boundary surface between adjacent concentric ring-shaped steps faces the periphery of said refractive lens.

7. An objective lens for an optical pick-up, comprising:
a refractive lens having a positive refractive power; and
a diffractive lens structure having a plurality of concentric ring-shaped steps that are formed on at least one lens surface of said refractive lens,
wherein said diffractive lens structure has such a wavelength dependence that at least two diffracted beams having different wavelengths with the same diffraction order form appropriate wavefronts for at least two kinds of optical discs having cover layers of different thickness, respectively, and
wherein an optical path difference function Φ(h) is defined such that the value thereof monotonously varies in a middle ring area that is concentrically arranged about the optical axis at a middle range of the radius of said refractive lens, when an additional optical path length added by said diffractive lens structure is expressed by the following optical path difference function:

$$\Phi(h)=(P_2 h^2+P_4 h^4+P_6 h^6+\ldots)\times m\times\lambda$$

where $P_2$, $P_4$ and $P_6$ are coefficients of second, forth and sixth orders, h is a height from the optical axis, m is diffraction order and $\lambda$ is wavelength.

8. The objective lens according to claim 7, wherein said refractive lens has a high NA exclusive area through which a light beam of a first NA, which is necessary only for an optical disc having a first recording density, passes, and a common area through which a light beam of a second NA, which is lower than said first NA and is necessary and sufficient for an optical disc having a second recording density that is lower than said first recording density, passes, wherein said common area is located at the center of the lens surface and is surrounded by said high NA exclusive area, and wherein said middle ring area is included in said common area.

9. The objective lens according to claim 8, wherein said optical path difference function $\Phi(h)$ is defined such that the value thereof monotonously varies in said common area.

10. The objective lens according to claim 7, wherein said middle ring area is defined as an area through which a light beam whose NA is 0.20 through 0.38 passes.

11. The objective lens according to claim 7, wherein said optical path difference function $\Phi(h)$ takes extreme value in an area that surrounds said middle ring area.

12. The objective lens according to claim 7, wherein said diffractive lens structure has such a wavelength dependence that spherical aberration varies in the undercorrected direction as wavelength of incident light beam increases.

13. The objective lens according to claim 12, wherein the following condition (1) is satisfied;

$$P_2\times(h_{45})^2\times m<3 \tag{1}$$

where $h_{45}$ is the height from the optical axis of a point where a light ray whose NA is 0.45 at the wavelength corresponding to the optical disc having thicker cover layer intersects said diffractive lens structure.

14. The objective lens according to claim 13, wherein the following condition (3) is satisfied;

$$\Phi(h_{45})/\lambda<-7 \tag{3}$$

15. The objective lens according to claim 13, wherein said diffractive lens structure satisfies the following condition (5) over the entire area on said lens surface;

$$\Phi(h)<0.5\lambda \tag{5}$$

16. The objective lens according to claim 12, wherein the following condition (2) is satisfied;

$$P_2\times(h_{45})^2\times m>8 \tag{2}$$

where $h_{45}$ is the height from the optical axis of a point where a light ray whose NA is 0.45 at the wavelength corresponding to the optical disc having thicker cover layer intersects said diffractive lens structure.

17. The objective lens according to claim 16, wherein the following condition (4) is satisfied;

$$\Phi(h_{45})/\lambda>8 \tag{4}$$

* * * * *